(12) United States Patent
Fan et al.

(10) Patent No.: US 9,130,780 B2
(45) Date of Patent: Sep. 8, 2015

(54) SYSTEM AND METHOD FOR IMPLEMENTING INTERACTIVE OPERATIONS BETWEEN A MOBILE COMMUNICATION TERMINAL AND AN EMAIL BOX WITH MULTIPLE COMMUNICATION MODES

(75) Inventors: Zheng Fan, Shenzhen (CN); Yuanyuan Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 655 days.

(21) Appl. No.: 12/910,529

(22) Filed: Oct. 22, 2010

(65) Prior Publication Data
US 2011/0040842 A1 Feb. 17, 2011

Related U.S. Application Data

(63) Continuation of application No. PCT/CN2009/071314, filed on Apr. 16, 2009.

(30) Foreign Application Priority Data

May 16, 2008 (CN) .......................... 2008 1 0097963

(51) Int. Cl.
*G06F 15/16* (2006.01)
*G06F 15/177* (2006.01)
(Continued)

(52) U.S. Cl.
CPC ........ *H04L 12/5895* (2013.01); *H04L 12/5835* (2013.01); *H04L 51/066* (2013.01);
(Continued)

(58) Field of Classification Search
CPC ............ H04L 15/5835; H04L 12/5895; H04L 51/066; H04L 51/38; H04L 67/28; H04L 67/303; H04W 4/18; H04W 4/12; H04W 80/12
USPC .......... 709/206, 219, 220; 370/252; 455/3.04, 455/412.1, 412.2, 466
See application file for complete search history.

(56) References Cited

U.S. PATENT DOCUMENTS

| | | | | |
|---|---|---|---|---|
| 6,356,533 | B1* | 3/2002 | Bruno et al. .................. | 370/252 |
| 6,704,576 | B1* | 3/2004 | Brachman et al. ............ | 455/503 |

(Continued)

FOREIGN PATENT DOCUMENTS

| | | |
|---|---|---|
| CN | 1404288 A | 3/2003 |
| CN | 1482829 A | 3/2004 |

(Continued)

OTHER PUBLICATIONS

Chinese Office Action for Chinese Patent Application No. 2008100979632, dated Apr. 13, 2010, and English translation thereof.

(Continued)

*Primary Examiner* — Daniel C Murray
(74) *Attorney, Agent, or Firm* — Harness, Dickey & Pierce, P.L.C.

(57) ABSTRACT

A system and method for implementing interactive operations between a mobile communication terminal and an Email box. The system includes a database (DB) server, a format transforming Email-box server and an intermediate processing server. The method includes the following: performing, by the mobile communication terminal, interactive operations with an Email-box server where the Email box located via an intermediate server; first determining, by the intermediate server, communication mode set by a corresponding user according to set user information, during process of performing an interactive operation procedure; and providing, by the intermediate server, an interactive-operations processing service for the user's mobile communication terminal and the user's Email box with determined communication mode.

10 Claims, 2 Drawing Sheets

(51) Int. Cl.
*H04H 60/09* (2008.01)
*H04L 12/26* (2006.01)
*H04L 12/58* (2006.01)
*H04M 1/725* (2006.01)
*H04W 4/12* (2009.01)
*H04L 29/08* (2006.01)
*H04W 4/18* (2009.01)
*H04W 8/18* (2009.01)
*H04W 80/12* (2009.01)

(52) U.S. Cl.
CPC ............... *H04L 51/38* (2013.01); *H04L 67/28* (2013.01); *H04L 67/303* (2013.01); *H04W 4/12* (2013.01); *H04W 4/18* (2013.01); *H04W 8/18* (2013.01); *H04W 80/12* (2013.01)

(56) References Cited

U.S. PATENT DOCUMENTS

| | | | |
|---|---|---|---|
| 7,054,653 B2* | 5/2006 | Jarvi et al. | 455/466 |
| 7,124,167 B1* | 10/2006 | Bellotti et al. | 709/206 |
| 7,245,718 B2* | 7/2007 | Sundaram et al. | 380/30 |
| 7,412,205 B2* | 8/2008 | Jarvi et al. | 455/3.04 |
| 7,886,012 B2* | 2/2011 | Bedi et al. | 709/206 |
| 7,903,814 B2* | 3/2011 | Aciicmez et al. | 380/30 |
| 8,086,253 B1* | 12/2011 | Kalamkar et al. | 455/466 |
| 8,121,898 B2* | 2/2012 | Altberg et al. | 705/14.73 |
| 8,126,128 B1* | 2/2012 | Hicks et al. | 379/201.05 |
| 8,352,555 B2* | 1/2013 | Channabasavaiah | 709/206 |
| 8,370,349 B2* | 2/2013 | Quoc et al. | 707/732 |
| 8,620,273 B2* | 12/2013 | Maguire et al. | 455/412.2 |
| 2002/0035605 A1* | 3/2002 | McDowell et al. | 709/206 |
| 2002/0069285 A1* | 6/2002 | Burger et al. | 709/228 |
| 2002/0078185 A1* | 6/2002 | Swerup et al. | 709/220 |
| 2002/0086706 A1* | 7/2002 | Chen et al. | 455/560 |
| 2002/0099799 A1* | 7/2002 | Kolsky | 709/219 |
| 2002/0128047 A1* | 9/2002 | Gates | 455/566 |
| 2003/0007464 A1* | 1/2003 | Balani | 370/310 |
| 2003/0069032 A1* | 4/2003 | Jarvi et al. | 455/466 |
| 2003/0104827 A1* | 6/2003 | Moran et al. | 455/466 |
| 2005/0003834 A1* | 1/2005 | Hughes | 455/456.1 |
| 2005/0034079 A1* | 2/2005 | Gunasekar et al. | 715/753 |
| 2005/0130631 A1* | 6/2005 | Maguire et al. | 455/414.1 |
| 2005/0182741 A1* | 8/2005 | Grossman et al. | 707/1 |
| 2005/0222908 A1* | 10/2005 | Altberg et al. | 705/14 |
| 2006/0030378 A1* | 2/2006 | Jarvi et al. | 455/575.1 |
| 2006/0218234 A1* | 9/2006 | Deng et al. | 709/206 |
| 2007/0058569 A1* | 3/2007 | McMenamin et al. | 370/254 |
| 2007/0130257 A1* | 6/2007 | Bedi et al. | 709/204 |
| 2007/0136473 A1* | 6/2007 | Birchler et al. | 709/226 |
| 2007/0191034 A1* | 8/2007 | Lee et al. | 455/466 |
| 2007/0203995 A1* | 8/2007 | Wang et al. | 709/206 |
| 2007/0283039 A1* | 12/2007 | Kim et al. | 709/238 |
| 2008/0005325 A1* | 1/2008 | Wynn et al. | 709/225 |
| 2008/0077468 A1* | 3/2008 | Raskin | 705/10 |
| 2008/0148154 A1* | 6/2008 | Burrell et al. | 715/733 |
| 2008/0208812 A1* | 8/2008 | Quoc et al. | 707/3 |
| 2008/0215684 A1* | 9/2008 | Thorkelsson et al. | 709/206 |
| 2008/0222263 A1* | 9/2008 | Wu et al. | 709/206 |
| 2008/0261625 A1* | 10/2008 | Hughes | 455/456.3 |
| 2009/0011741 A1* | 1/2009 | Maguire et al. | 455/412.1 |
| 2009/0028323 A1* | 1/2009 | Aciicmez et al. | 380/28 |
| 2009/0030773 A1* | 1/2009 | Kamhoot | 705/10 |
| 2009/0049125 A1* | 2/2009 | Channabasavaiah | 709/204 |
| 2009/0161633 A1* | 6/2009 | Chen et al. | 370/335 |
| 2010/0324961 A1* | 12/2010 | Singh et al. | 705/8 |
| 2011/0029319 A1* | 2/2011 | Mills et al. | 705/2 |
| 2011/0029376 A1* | 2/2011 | Mills et al. | 705/14.43 |
| 2011/0047246 A1* | 2/2011 | Frissora et al. | 709/219 |
| 2011/0195691 A9* | 8/2011 | Maguire et al. | 455/412.1 |
| 2011/0208813 A1* | 8/2011 | Storrie et al. | 709/204 |
| 2012/0079475 A1* | 3/2012 | Hicks et al. | 717/174 |
| 2014/0080460 A1* | 3/2014 | Maguire et al. | 455/414.1 |

FOREIGN PATENT DOCUMENTS

| | | | | |
|---|---|---|---|---|
| CN | 1688127 A | 10/2005 | | |
| CN | 1710580 A | 12/2005 | | |
| CN | 1710893 A | 12/2005 | | |
| CN | 1988689 A | 6/2007 | | |
| CN | 101146241 A | 3/2008 | | |
| CN | 101282361 A | 10/2008 | | |
| EP | 1 531 595 A1 * | 5/2005 | ............ | H04L 29/06 |
| JP | 2007109191 A | 4/2007 | | |

OTHER PUBLICATIONS

International Search Report for International Patent Application No. PCT/CN2009/071314, dated Jul. 30, 2009, and English translation thereof.

* cited by examiner

SYSTEM AND METHOD FOR IMPLEMENTING INTERACTIVE OPERATIONS BETWEEN A MOBILE COMMUNICATION TERMINAL AND AN EMAIL BOX WITH MULTIPLE COMMUNICATION MODES

CROSS-REFERENCE TO RELATED APPLICATIONS

This application is a continuation of International Application No. PCT/CN2009/071314, filed Apr. 16, 2009. This application claims the benefit and priority of Chinese Patent Application No. 200810097963.2, filed May 16, 2008. The entire disclosures of each of the above applications are incorporated herein by reference.

FIELD

The present disclosure relates to mobile communications and Email communication technologies, and more particularly, to a system and method for implementing interactive operations between a mobile communication terminal and an Email box.

BACKGROUND

This section provides background information related to the present disclosure which is not necessarily prior art.

An associated service between an Email box and a mobile communication terminal is to bind a user's Email-box number with the user's mobile communication terminal number, so as to make an Email-box user utilize a mobile communication terminal to receive a new-Email reminding message from a bound Email-box, meanwhile the mobile communication terminal may also be utilized to complete various kinds of Email-box operations, such as reading operation, writing operation, replying operation and forwarding operation about an Email.

FIG. 1 is a schematic diagram illustrating existed exemplary interactive operations between a mobile communication terminal and an Email box. With reference to FIG. 1, the core of interactive operations between the mobile communication terminal and the Email box lies in transit server. The transit server generally needs to complete the following functions.

1) Receiving a new-Email reminder sent by the Email-box server via the Internet, filtering according to filter-conditions set by user, sending a new-Email reminder which meets the filter-conditions to the mobile communication terminal through Short Message Service (SMS).

2) The mobile communication terminal initiates requests, such as reading-Email request and/or writing-Email request to the transit server with the SMS mode. After performing a series of checks, such as an authentication check and an integrity check, the transit server forwards the requests to the Email-box server, and provides interactive services, which include a reading operation and a writing operation, for the mobile communication terminal and the Email-box server with the SMS mode.

However, current interactive operation mode between the mobile communication terminal and the Email box has the following disadvantages.

Due to the single mode for operating Email box, mobile communication terminal users may only complete Email-related operations by accessing an Email box with the SMS mode. The direct result brought about by the single operation mode is inconvenient operations, and low efficiency of interactive operations. Besides, when accessing the Email box with the SMS mode, the operation mode will be loaded down with trivial details, e.g., it is necessary to input instructions frequently, and there may be some limitations for length of the message content, thus efficiency of the interactive operations will be low.

SUMMARY

This section provides a general summary of the disclosure, and is not a comprehensive disclosure of its full scope or all of its features.

In view of above, the technical problem to be solved is to provide a system for implementing interactive operations between a mobile communication terminal and an Email box, so as to implement the interactive operations between the mobile communication terminal and a bound Email box with various kinds of communication modes. Thus, efficiency of the interactive operations performed by the mobile communication terminal on Email information may be improved.

Another technical problem to be solved is to provide a method for implementing interactive operations between a mobile communication terminal and an Email box, so as to implement the interactive operations between the mobile communication terminal and a bound Email box with various kinds of communication modes. Thus, efficiency of the interactive operations performed by the mobile communication terminal on the Email information may be improved.

To achieve the above objectives, the main technical solution is as follows.

A system for implementing interactive operations between a mobile communication terminal and an Email-box, including:

a database (DB) server, adapted to store setting information of a user, wherein the setting information of the user comprises communication mode information of the user;

a format transforming Email-box server, adapted to transform information of the Email box into a format supported by the mobile communication terminal for the mobile communication terminal to access;

an intermediate processing server, adapted to determine a communication mode of the user according to the setting information in the DB server, if the communication mode of the user comprises the communication mode corresponded to the format, inform the mobile communication terminal to access the format transforming Email-box server with the communication mode corresponded to the format.

the format transforming Email-box server is a Wireless Application Protocol (WAP) Email-box server which is adapted to transform information of the Email box into a WAP format;

When determining the communication mode includes the WAP communication mode, the intermediate processing server informs the mobile communication terminal to perform the interactive operations with the WAP Email-box server with the WAP communication mode.

When determining the user's communication mode fails to include the WAP communication mode, the intermediate processing server provides interactive-operations processing services for the user's mobile communication terminal and the user's Email box server where the user's Email box located with a SMS mode.

A method for implementing interactive operations between a mobile communication terminal and an Email box, including:

performing, by the mobile communication terminal, interactive operations with an Email-box server where the Email box located via an intermediate server;

firstly determining, by the intermediate server, communication mode set by a corresponding user according to set user information, during process of performing an interactive operation procedure; and providing, by the intermediate server, an interactive-operations processing service for the user's mobile communication terminal and the user's Email box with determined communication mode.

When determining the communication mode includes the WAP communication mode, interactive-operations processing services are provided for the user's mobile communication terminal and the user's Email box with the WAP communication mode.

When determining corresponding user fails to set the WAP communication mode, the interactive-operations processing services are provided for the user's mobile communication terminal and the user's Email box with the SMS mode.

In various embodiments, by storing communication mode information set by a user in a database server, and transforming Email-box information into a format supported by the user's mobile communication terminal according to the communication mode information, the mobile communication terminal is enabled to adopt various kinds of communication modes to implement interactive operations with the Email box. Thus efficiency of the interactive operations performed by the mobile communication terminal on the Email information may be improved.

Furthermore, in various embodiments n, general Email information is displayed by a Wireless Application Protocol (WAP) Email-box server in the manner of WAP, so as to support direct access of the mobile communication terminal. Meanwhile, the user's communication mode may be determined during the process of providing interactive operation services. When the WAP communication mode is supported, the interactive operations services for the mobile communication terminal and the Email box may be provided in the manner of WAP. Thus, the deficiencies of inconvenient usage and low efficiency may be avoided when operating an Email box by the mobile communication terminal with the SMS mode. A mobile user may be enabled to operate his/her Email box with the mobile communication terminal and in the manner of WAP, thus the user's experience may be improved, operating for the Email box during the user's moving process may be facilitated, and operation efficiency for the Email box may be enhanced.

Various embodiments further disclose that, if the mobile communication terminal is determined not be able to support the WAP communication mode, the SMS mode will be adopted to provide interactive operation services for the mobile communication terminal and the Email box. Thus the mobile communication terminal may be enabled to adopt two modes, e.g., the SMS mode and the WAP mode, to operate the Email box, which may not only facilitate the user's operations for the Email box, but also improve the user's experience.

In various embodiments, an instant communication mode may be provided between a mobile communication terminal user and his/her Email contact by using Instant Messaging (IM) tools, which may not only further satisfy requirements of IM users, but also improve communication efficiency among users.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Detailed descriptions of the invention are further provided in the following accompanying with specific embodiments and drawings.

The core technical solution of the invention is as follows. The user's Email-box number is bound with the user's mobile communication terminal number, the mobile communication terminal performs interactive operations with an Email-box server where the bound Email box is located via an intermediate server; at the intermediate server side, Email information received or sent by the Email-box server is transformed into WAP format for the mobile communication terminal to access, meanwhile the user's communication mode is set at the intermediate server side. During the process of the interactive operations, the intermediate server first determines whether WAP communication mode has been set for the corresponding user, and then selects SMS mode and/or WAP mode according to the determining result, to provide interactive-operations processing services for the user's mobile communication terminal and his/her Email box.

Figure 1:
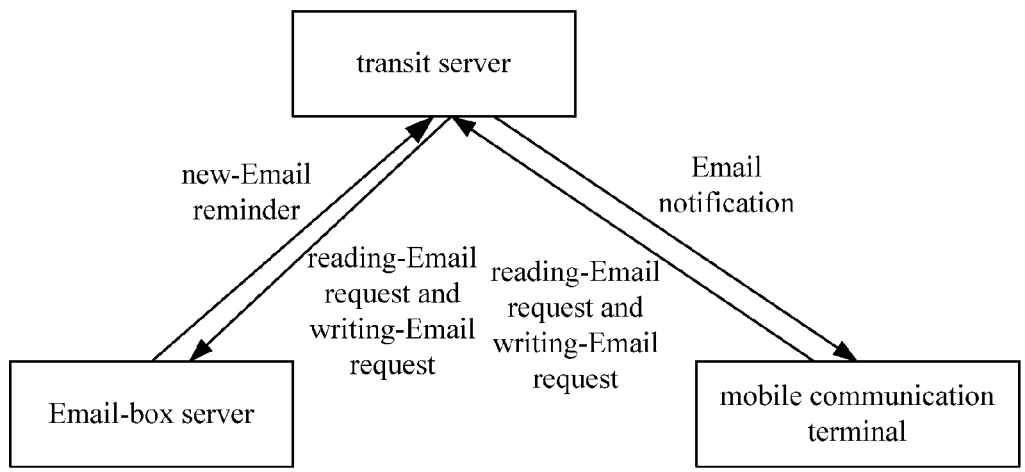
FIG. 1 is a schematic diagram illustrating existed exemplary interactive operations between a mobile communication terminal and an Email box.
Figure 2:
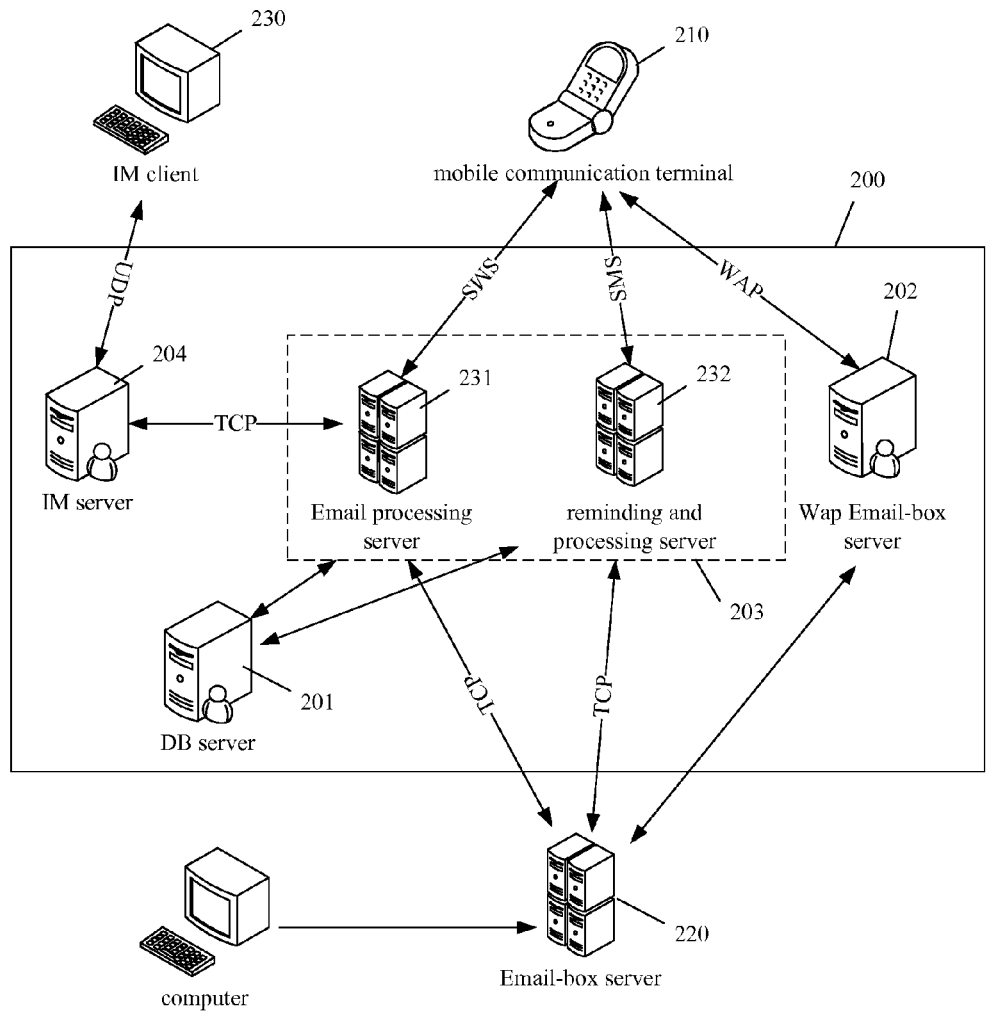
FIG. 2 is a schematic diagram illustrating structure of a system for implementing interactive operations between a mobile communication terminal and an Email box in accordance with various embodiments.

FIG. 2 is a schematic diagram illustrating structure of a system for implementing interactive operations between a mobile communication terminal and an Email box in accordance with an embodiment. As shown in FIG. 2, a system 200 is set between a mobile communication terminal 210 and an Email-box server 220, in which an Email box bound with mobile communication terminal 210 is located at Email-box server 220, and Email-box server 220 is set at the Internet side, a user may directly access Email-box server 220 by logging on the Internet with a computer. The system in the embodiment mainly constitutes multiple intermediate servers, which include the following.

Database (DB) server 201 is configured to store every kind of setting information about the user. In various embodiments, the setting information mainly includes user identifier information, user's communication mode information and filtering conditions, such as notification period and sender limitation.

WAP Email-box server 202, which interacts with Email-box server 220, is configured to transform an Email box of Email-box server 220 in the format of Internet into the WAP format, which may be accessed in a wireless communication network. The user's mobile communication terminal may access the WAP Email-box server with the WAP communication mode, e.g., via the General Packet Radio Service (GPRS) network, thus direct interactive operations with the user's WAP Email box may be achieved.

Intermediate processing server 203 which respectively communicates with mobile communication terminal 210, DB server 201 and Email-box server 220, is configured to forward and process interactive operation messages between mobile communication terminal 210 and Email-box server 220. During the process of interactive operations between mobile communication terminal 210 and Email-box server 220, intermediate processing server 203 first determines the corresponding user's communication mode according to the setting information in DB server 201, and then according to the determining result, provides interactive-operations processing services for the user's mobile communication terminal and the user's Email box with the SMS mode, and/or inform the mobile communication terminal to adopt the WAP mode to perform interactive operations with the WAP Email-box server.

Specifically speaking, intermediate processing server 203 includes Email processing server 231 as well as reminding and processing server 232.

Email processing server 231 communicates with mobile communication terminal 210 using the SMS mode, and communicates with Email-box server 220 using Transmission Control Protocol (TCP) protocol. Email processing server 231 is mainly configured to receive reading-Email request and/or writing-Email request of mobile communication terminal 210, and then query communication mode set by the user corresponding to the mobile communication terminal from DB server 201. If the user fails to set the WAP mode, Email processing server 231 will adopt the SMS mode to interact with the mobile communication terminal to complete reading and writing operations. If the user has set the WAP mode, Email processing server 231 will inform the mobile communication terminal to access the WAP Email-box server using the WAP mode, so as to complete the reading and writing operations.

Reminding and processing server 232 communicates with mobile communication terminal 210 using the SMS mode, and communicates with Email-box server 220 using the TCP protocol. Reminding and processing server 232 is mainly configured to receive a new-Email notification message from Email-box server 220, and then query communication mode set by the user corresponding to the mobile communication terminal from DB server 201. If the user fails to set the WAP mode, reminding and processing server 232 will send the new-Email notification message to the mobile communication terminal using the SMS mode. If the user has set the WAP mode, reminding and processing server 232 will send the new-Email notification message to the mobile communication terminal using the SMS mode or WAPpush mode. In addition, reminding and processing server 232 may also filter new-Email notification messages coming from Email server 220 according to filtering conditions set by the user, and only send new-Email notification messages meeting the filtering conditions to mobile communication terminal 210.

The system may further include IM server 204, which is configured to provide IM communication services for IM users. The IM users may interact with IM server 204 via an IM client, so as to perform instant chatting with corresponding communication node. In the embodiment, Email processing server 231 communicates with IM server 204 using the TCP protocol. After receiving the writing Email request from mobile communication terminal 210, Email processing server 231 communicates with IM server 204, queries IM user information from IM server 204, determines, according to querying result, whether writing-Email user and corresponding receiving-Email user are both IM users, and determines whether the IM client corresponding to the receiving-Email user is currently online. If yes, IM server 204 will be triggered to provide IM communication services for the writing-Email user and the receiving-Email user (e.g., mobile communication terminal 210 and IM client 230 in FIG. 2), and to forward corresponding IM information between IM server 204 and mobile communication terminal 210.

In order to adapt to special requirements of interactive operations between mobile communication terminal and Email box, there may be some special designs for the reminding and processing server, the Email processing server and the DB server in the embodiment, so as to achieve more optimized effects.

With reference to the reminding and processing server, since it is necessary for the reminding and processing server to remind the mobile communication terminal once receiving Emails, the problem of sudden increase of data amount brought about by sudden Email surge needs to be addressed. Thus, in various embodiments, General network process (GNP) is taken as network layer structure. Both efficiency and reliability of the structure have already been validated, and 5 W network throughput may be supported at most. Supposing peak processing capability of each server is 1 W, it is expected to possess two reminding and processing servers at most. Second, in order to improve filtering efficiency, during the process of initiating the reminding and processing server, all the user setting information (e.g., frequency and period for the user receiving reminders, etc) in the DB server is loaded into memory of the reminding and processing server. Preferably, all the user setting information is loaded into the reminding and processing server at one-time. The user information refers to user information of the user with Email-box bound. Under normal circumstances, number of these users is about 1 M order of magnitude. Thus, these users' information may be fully buffered in memory. Third, the Email processing server may also provide a user interface in a certain format (e.g., webpage interface and short message interface), and a user may modify user information in the database via the user interface. If the user has modified some setting information, the Email processing server may first record the settings in the DB server, and then inform the reminding and processing server to update related user information in its memory, to ensure the consistency between the user information in the database and the user information in memory.

With reference to the Email processing server, a fault-tolerant framework is adopted in various embodiments. The fault-tolerant framework, which is built on the basis of In-circuit Emulator (ICE), allows services to be deployed paralleled to more than one Email processing servers. Even if a certain host has a fault, usage of the Email processing services will not be affected.

With reference to storage of user information in various embodiments, when setting user information, user identifier may be taken as index and may be taken modulus to obtain a modulus value, and then a storage table may be set according to the modulus value. The user information may be respectively stored in a storage table corresponding to the modulus value. When querying a certain user's information, the certain user's identifier will be modulused at first, and then the certain user's information will be searched in a storage table corresponding to the modulus value of the certain user. For example, in a user database with Email box bounded, user's UIN number is taken as index of the user information. The user information is respectively stored in 100 data tables using an algorithm of taking modulus by 100 for each user's UIN number. Supposing each data table stores 100K items of user information on average, the system may support user capacity about 10 M. By taking modulus of the UIN number when querying, the table corresponding to the UIN number may be directly found, and then corresponding UIN information in the table may be searched.

Specific processes for each kind of interacive operations are respectively introduced in the following.

Blocks 311 to 314 are a new-Email notification flow, which specifically includes the following.

Block 311, once receiving an Email, an Email box bound with a user's mobile communication terminal extracts related contents of the Email, such as subject, carries the extracted contents about the Email in a new-Email notification message to send to the reminding and processing server.

Block 312, the reminding and processing server determines whether to issue the new-Email notification message to the user's mobile communication terminal according to filtering conditions set by the user, such as notification period and sender limitations.

Block 312, if it is necessary to issue the new-Email notification message to the user's mobile communication terminal, the reminding and processing server may search the user's setting information, and determine whether the user has set the WAP mode. If the user has set the WAP mode, the reminding and processing server will send the new-Email notification message to bound mobile communication terminal using the WAPpush mode, in which the new-Email notification message sent using the WAPpush mode includes the WAP linking address of the new Email. If the user fails to set the WAP mode, the reminding and processing server may send the new-Email notification message to bound mobile communication terminal using the SMS mode.

Block 314, after receiving an SMS short message, the user mobile communication terminal may perform further reading operation and/or writing operation on the Email using SMS instructions. After receiving a WAPpush reminder, the user mobile communication terminal may directly access the WAP Email-box server via the GPRS network, so as to read and write its Email-box in the format of WAP webpage.

The following blocks 321 to 323 describe a flow for reading Emails by a user mobile communication terminal, which specifically includes the following.

Block 321, a user mobile communication terminal sends a reading-Email request to an Email processing server.

Block 322, the Email processing server queries the user's setting information, and determines communication mode set by the user. If the user has set the WAP mode, the Email processing server sends WAP linking address of an Email to be read to the mobile communication terminal using the WAPpush mode. The mobile communication terminal accesses the WAP Email-box server via the GPRS network, so as to read the WAP linking address, and read the Email according to the linking address.

Block 323, if the user fails to set the WAP mode, the Email processing server obtains contents of an Email to be read from the Email-box server, and sends the Email contents to the user mobile communication terminal with at least one SMS message.

The following blocks 331 to 335 describe a flow for writing Email by a user mobile communication terminal, which specifically includes the following.

Block 331, the user mobile communication terminal sends a writing-Email request to the Email processing server.

Block 332, the Email processing server queries the user's setting information, and determines the user's communication mode. If the user has set the WAP mode, the Email processing server sends WAP linking address of an Email to be written to the mobile communication terminal in the WAP-push mode. The mobile communication terminal accesses the WAP Email-box server via the GPRS network, so as to access the WAP linking address of the Email to be written to perform writing operations.

Block 333, if the user fails to set the WAP mode, the Email processing server determines whether writing-Email user and receiving-Email user are both IM users, and determines whether an IM client corresponding to the receiving-Email user is currently online. If yes, the Email processing server triggers the IM server to provide IM communication services for the writing-Email user and receiving-Email user, at this time, the Email processing server needs to forward the IM information between the IM server and the writing-Email user; otherwise, proceeding to block 334. In this block, it is necessary for the user mobile communication terminal to carry receiving-Email user identifier when sending the writing-Email request. The specific determining method may be as follows. Connecting the IM server, querying in the database of the IM server whether the writing-Email user and the receiving-Email user are both IM users, and querying whether the IM client of the receiving-Email user is currently online.

Block 334, the Email processing server prompts the user mobile communication terminal with the SMS communication mode, to complete every kind of operations for writing Email, e.g., inputting receiver, subject, contents, etc. After receiving contents about all the writing operations of one Email, the Email processing server packets the contents of the Email and sends to the Email-box server. Then the Email-box server sends the Email to the sender.

The foregoing is only preferred embodiments of the disclosure, which is not used for limiting scope of protection. Any change or substitutions within the technical scope disclosed by various embodiments, which easily occur to one skilled in the art, should be covered in the scope of protection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for implementing interactive operations between a mobile communication terminal and an Email box, comprising:
   a mobile communication terminal;
   a network;

a database (DB) server, to store setting information of a user, wherein the setting information of the user comprises communication mode information of the user;

a Wireless Application Protocol (WAP) Email-box server, to transform information of the Email box into a WAP format for the mobile communication terminal to access;

an intermediate processing server, to determine communication mode of the user according to the setting information in the DB server, when determining the communication mode of the user comprises the WAP communication mode, inform, via the network, the mobile communication terminal to access the WAP Email-box server with the WAP communication mode; when determining the communication mode of the user fails to comprise the WAP communication mode, provide interactive-operations processing services for the user's mobile communication terminal and the Email-box server where the user's Email box located with a Short Message Service (SMS) mode;

wherein the intermediate processing server comprises:

an Email processing server, to receive a reading-Email request or a writing-Email request from the mobile communication terminal, according to the communication mode set by the corresponding user, adopt the SMS mode to interact with the mobile communication terminal to complete reading operation or writing operation, or inform the mobile communication terminal to access the WAP Email-box server with the WAP communication mode to complete the reading operation or the writing operation; and a reminding and processing server, to receive a new-Email notification message coming from the Email-box server where the user's Email box located, adopt the SMS mode or WAPpush mode to send the notification message to the mobile communication terminal, according to the communication mode set by the user;

wherein the reminding and processing server takes General network process, GNP, as network layer structure;

during the process of initiating the reminding and processing server, all user setting information in the DB server is loaded into memory of the reminding and processing server for one-time.

2. The system according to claim 1, further comprising an Instant Messaging (IM) server, which is to provide IM communication service for IM users; and the intermediate processing server is further to communicate with the IM server after receiving an writing-Email request from the mobile communication terminal, determine whether a writing-Email user and corresponding receiving-Email user are both IM users, and determine whether an IM client corresponding to the receiving-Email user is currently online; if yes, trigger the IM server to provide the IM communication service for the writing-Email user and the receiving-Email user, and forward corresponding IM information between the IM server and the mobile communication terminal via the network.

3. A method for implementing interactive operations between a mobile communication terminal and an Email box, comprising:

performing, by the mobile communication terminal, interactive operations with an Email-box server where the Email box located via an intermediate server;

firstly determining, by the intermediate server, communication mode set by a corresponding user according to set user information, during process of performing an interactive operation procedure;

informing, by the intermediate server, the mobile communication terminal to access a Wireless Application Protocol (WAP) Email-box server when determining the communication mode set by the corresponding user comprises a WAP communication mode; and providing, by the intermediate server, an interactive-operations processing service for the user's mobile communication terminal and the user's Email box with a Short Message Service (SMS) mode when determining the communication mode set by the corresponding user fails to comprise the WAP communication mode;

wherein the intermediate server comprises a intermediate processing server; and the intermediate processing server comprises a reminding and processing server;

wherein the interactive operation procedure comprises a new-Email notification procedure, providing the interactive-operations processing service comprises:

sending, by the Email-box server, a new-Email notification message to the reminding and processing server, after the Email box receives an Email;

determining, by the reminding and processing server, the communication mode set by the user, if the WAP communication mode has been set, sending, by the reminding and processing server, the new-Email notification message to bound mobile communication terminal with WAPpush mode; if the WAP communication mode hasn't been set, sending, by the reminding and processing server, the new-Email notification message to the bound mobile communication terminal with the SMS mode;

wherein the reminding and processing server takes General network process, GNP, as network layer structure;

during the process of initiating the reminding and processing server, all user setting information in the DB server is loaded into memory of the reminding and processing server for one-time.

4. The method according to claim 3 wherein the user information is set in a database, the new-Email notification procedure is completed by a dedicated reminding and processing server, and the method further comprises:

loading the user information in the database into memory of the reminding and processing server, during initiation procedure of the reminding and processing server;

when receiving the new-Email notification message, querying the memory by the reminding and processing server to obtain related user information.

5. The method according to claim 3, wherein the interactive operation procedure comprises a reading-Email procedure, providing the interactive-operations processing service comprises:

sending, by the user's mobile communication terminal, a reading-Email request to the intermediate server;

determining, by the intermediate server, the communication mode set by the user;

if the WAP mode has been set, a WAP linking address of an Email to be read being sent to the mobile communication terminal with the WAPpush mode, and accessing, by the mobile communication terminal, the WAP linking address with the WAP mode to read the Email;

if the WAP mode hasn't been set, reading contents of corresponding Email from the Email-box server, and sending the Email contents to the user mobile communication terminal with at least one SMS messages.

6. The method according to claim 3,
the intermediate processing server further comprises a Email processing server;
wherein the interactive operation procedure comprises a writing-Email procedure, providing the interactive-operations processing service comprises:
sending, by the user's mobile communication terminal, a writing-Email request to the Email processing server;
determining, by the Email processing server, the communication mode set by the user;
if the WAP mode has been set, sending, by the Email processing server, a WAP linking address of an Email to be written to the mobile communication terminal with the WAPpush mode, and accessing by the mobile communication terminal the WAP linking address to perform the writing-Email operations with the WAP mode; if the WAP mode hasn't been set, prompting the user's mobile communication terminal to complete every kind of operations for writing Email with the SMS communication mode, and after receiving all the contents about the writing operations for one Email, packeting and sending the Email's contents to the Email-box server.

7. The method according to claim 6, wherein when determining the communication mode set by the corresponding user fails to comprise the WAP communication mode and the interactive operation procedure comprises a writing-Email procedure, the method further comprises:
determining, by the intermediate processing server, whether writing-Email user and receiving-Email user are both Instant Messaging (IM) users, and determining whether an IM client corresponding to the receiving-Email user is currently online, if yes, triggering the IM server to provide IM communication service for the writing-Email user and the receiving-Email user, and forwarding IM information between the IM server and the writing-Email user.

8. The method according to claim 3, wherein
when setting the user information, taking user identifier as index, taking modulus of the user identifier to obtain a modulus value, setting a storage table according to modulus value, and respectively storing the user information in a storage table corresponding to the modulus value;
when querying the user information, taking modulus of the user identifier at first, and querying the user information in the storage table corresponding to the modulus value.

9. The system according to claim 8, wherein the reminding and processing server is further to, during the process of being initiated, load all the setting information of the user into memory of the reminding and processing server; and
after receiving the new-Email notification message, the reminding and processing server obtains the communication mode set by the user by querying the memory of the reminding and processing server.

10. The system according to claim 9, wherein the Email processing server is further to provide a user interface in a certain format, receive modification about user information made by the user via the user interface, record modified user information in the DB server, and inform the reminding and processing server to update related user information in its memory.

* * * * *